United States Patent
Wu et al.

(10) Patent No.: US 7,346,727 B2
(45) Date of Patent: Mar. 18, 2008

(54) METHOD AND SYSTEM FOR CONTROL OF A FIRST DEVICE BY DATA STORAGE DEVICE THROUGH STORING DIFFERENT VALUES WITHIN TASK FILE REGISTER BY THE DATA STORAGE DEVICE AND READING TASK FILE REGISTER AND PERFORMING CORRESPONDING PREDETERMINED OPERATIONS BY THE FIRST DEVICE VIA AN IDE BUS

(75) Inventors: Yuan-Ting Wu, Hsin-Chu (TW); Shu-Fang Tsai, Hsin-Chu (TW)

(73) Assignee: MediaTek Inc., Hsin-Chu, Hsien (TW)

( * ) Notice: Subject to any disclaimer, the term of this patent is extended or adjusted under 35 U.S.C. 154(b) by 0 days.

(21) Appl. No.: 11/379,804

(22) Filed: Apr. 24, 2006

(65) Prior Publication Data

US 2006/0206651 A1    Sep. 14, 2006

Related U.S. Application Data

(63) Continuation-in-part of application No. 10/250,213, filed on Jun. 13, 2003, now abandoned.

(51) Int. Cl.
*G06F 13/36* (2006.01)

(52) U.S. Cl. ............ 710/311; 710/306; 710/71; 710/74

(58) Field of Classification Search ........ 710/305–317, 710/6–14, 62–64, 71–74
See application file for complete search history.

(56) References Cited

U.S. PATENT DOCUMENTS

| | | | |
|---|---|---|---|
| 5,701,450 A * | 12/1997 | Duncan | 712/245 |
| 5,890,002 A | 3/1999 | Li et al. | |
| 6,732,218 B2 * | 5/2004 | Overtoom et al. | 710/313 |
| 6,810,440 B2 * | 10/2004 | Micalizzi, Jr. et al. | 710/19 |
| 6,826,648 B1 | 11/2004 | Yatziv | |
| 6,862,648 B2 | 3/2005 | Meyer | |
| 7,076,580 B2 * | 7/2006 | Nakano | 710/65 |
| 7,246,192 B1 * | 7/2007 | Chang | 710/311 |
| 2003/0033465 A1 | 2/2003 | Chien et al. | |
| 2003/0154340 A1 * | 8/2003 | Bolt et al. | 710/305 |
| 2004/0267972 A1 * | 12/2004 | Ou et al. | 710/8 |
| 2005/0060479 A1 * | 3/2005 | Deng et al. | 710/306 |
| 2005/0080974 A1 * | 4/2005 | Lin | 710/315 |
| 2007/0016702 A1 * | 1/2007 | Pione et al. | 710/62 |

* cited by examiner

*Primary Examiner*—Raymond N Phan
(74) *Attorney, Agent, or Firm*—Winston Hsu

(57) ABSTRACT

A system includes a first device; an Integrated Drive Electronics (IDE) bus; and a data storage device having a first task file register, the data storage device being coupled to the first device via the IDE bus for storing data within the data storage device as received from the first device via the IDE bus, or for passing the data stored within the data storage device to the first device via the IDE bus according to commands passed from the first device via the IDE bus. The data storage device is further for controlling predetermined operations of the first device by storing different values within the first task file register, and the first device is for reading the first task file register of the data storage device via the IDE bus and performing the predetermined operations according to the different values.

22 Claims, 4 Drawing Sheets

METHOD AND SYSTEM FOR CONTROL OF A FIRST DEVICE BY DATA STORAGE DEVICE THROUGH STORING DIFFERENT VALUES WITHIN TASK FILE REGISTER BY THE DATA STORAGE DEVICE AND READING TASK FILE REGISTER AND PERFORMING CORRESPONDING PREDETERMINED OPERATIONS BY THE FIRST DEVICE VIA AN IDE BUS

CROSS REFERENCE TO RELATED APPLICATIONS

This is a continuation-in-part of U.S. application Ser. No. 10/250,213 entitled, "Method and Apparatus for Control of Another Device Through an IDE Bus", which was filed on Jun. 13, 2003 and is included herein by reference.

BACKGROUND

The present invention relates to control of another device through an Integrated Drive Electronics (IDE) bus. More specifically, an apparatus and method for an IDE device to control another device through the IDE bus, reducing the cost and complexity of a second device communicating with the IDE device, is disclosed.

The modularization of components for many of today's electronic devices has benefited manufacturers and consumers alike. The consumer has the flexibility to select from a variety of components or add additional hardware according to his or her needs. The manufacturer has the advantages of specialization, reducing costs and increasing performance of the particular component. One quite common example of such an arrangement is the ability of the user to add a device, such as an optical disc drive, to a preexisting host computer system.

As with non-modularized systems, a basic requirement for the proper functionality of the system is establishing a protocol for effective communications between the various components and the host system. Therefore, a variety of industry standard communication protocols have been developed and are currently in use, such as versions of a Universal Serial Bus (USB), Integrated Drive Electronics (IDE), and Small Computer System Interface (SCSI) interfaces as a few examples. As long as the host system and the component utilize the same protocol, communications allowing the proper functioning of the component are possible.

An obvious communication problem occurs when a user wishes to attach a device that uses one protocol to a system connection using a different protocol, for example connecting an external IDE device to a USB port of the system. In this situation an intermediate device, or bridge, is often used between the device and the host system to permit effective communications.

FIG. 1 is a functional block diagram of conventional Host-Bridge-Device system 10. The system 10 comprises a host 15, a bridge 20, and a device 25. A first bus interface 30 connects the host 15 with the bridge 20 and allows communications between the host 15 and the bridge 20 according to a first communications protocol. A second bus interface 35 connects the bridge 20 with the device 25 and allows communications between the bridge 20 and the device 25 according to a second communications protocol. The second communications protocol used in the Host-Bridge-Device system 10 is a version of Integrated Device Electronics (IDE).

The bridge 20 comprises a circuitry 50 to control the operations of bridge 20. The circuitry 50 comprises a microprocessor 60, a memory 65, and a microprocessor interface 55. The bridge 20 further comprises a plurality of registers 75 used for controlling the functions of the bridge 20. The registers 75 may be comprised within the memory 65 or they may be comprised elsewhere within the bridge 20 according to design considerations. The device comprises a microprocessor 90, firmware 95, and a corresponding plurality of IDE I/F task file registers 85 used for the transfer of data and control instructions to and from the bridge 20. The memory 65 may be volatile and/or non-volatile and is used to store computer code 70 that is executed by the microprocessor 60 to effect control of the bridge 20. The bridge 20 accesses the device 25 through the IDE bus 35 by the reading and writing of data and control instructions to and from the IDE I/F task file registers 85 in the device 25. The microprocessor 60 controls the bridge 20 to access the device 25 by the reading and writing of data and control instructions to and from the registers 75 in the bridge 20.

While the above-described circuitry 50 is capable of controlling the operations of bridge 20, the inclusion of the circuitry 50 to control the operations of bridge 20 raises the cost and complexity of the bridge 20.

SUMMARY

It is therefore an objective of the claimed invention to reduce the cost and complexity of a Host-Bridge-Data Storage Device system by using the data storage device to control the bridge, through an Integrated Device Electronics (IDE) bus.

Briefly summarized, the preferred embodiment of the claimed invention discloses an apparatus and method that allow the data storage device to control the other device, such as a bridge, through the IDE bus. Because an IDE data storage device already includes the circuitry necessary for control of the other device, the necessary circuitry can be eliminated from the other device. Only a change to the firmware already included in the IDE data storage device is necessary to successfully implement control of the other device through the IDE bus.

According to a first exemplary embodiment of the present invention, a system is disclosed comprising a first device; an Integrated Drive Electronics (IDE) bus; and a data storage device having a first task file register, the data storage device being coupled to the first device via the IDE bus for storing data within the data storage device as received from the first device via the IDE bus, or for passing the data stored within the data storage device to the first device via the IDE bus according to commands passed from the first device via the IDE bus. The data storage device is further for controlling predetermined operations of the first device by storing different values within the first task file register, and the first device is for reading the first task file register of the data storage device via the IDE bus and performing the predetermined operations according to the different values.

According to a first exemplary embodiment of the present invention, a method is disclosed for utilizing an Integrated Drive Electronics (IDE) bus for controlling a first device by a data storage device, the method comprising providing a first task file register in the data storage device; coupling the first device to the data storage device via the IDE bus; storing data within the data storage device as received from the first device via the IDE bus and passing the data stored within the data storage device to the first device via the IDE bus according to commands passed from the first device via the IDE bus; storing different values within the first task file register by the data storage device; reading the first task file register of the data storage device via the IDE bus by the first device; and performing the predetermined operations by the first device according to the different values read from the first task file register.

It is an advantage of the claimed invention that the IDE data storage device can control the second device through an IDE bus, reducing the cost and complexity of the second device when communicating with the IDE data storage device using an IDE communications protocol.

These and other objectives of the present invention will no doubt become obvious to those of ordinary skill in the art after reading the following detailed description of the preferred embodiment that is illustrated in the various figures and drawings.

DETAILED DESCRIPTION

In this application, the term Integrated Device Electronics (IDE) is defined to encompass all protocols based upon IDE technology, including Advanced Technology Attachment (ATA), Advanced Technology Attachment Packet Interface (ATAPI), and Serial ATA. In addition, in this application, the term IDE data storage device, such as various forms of data storage devices including a hard disk drive and an optical disc drive, refers to an apparatus requiring an IDE communications connection with a second device for proper functionality.

Figure 1:
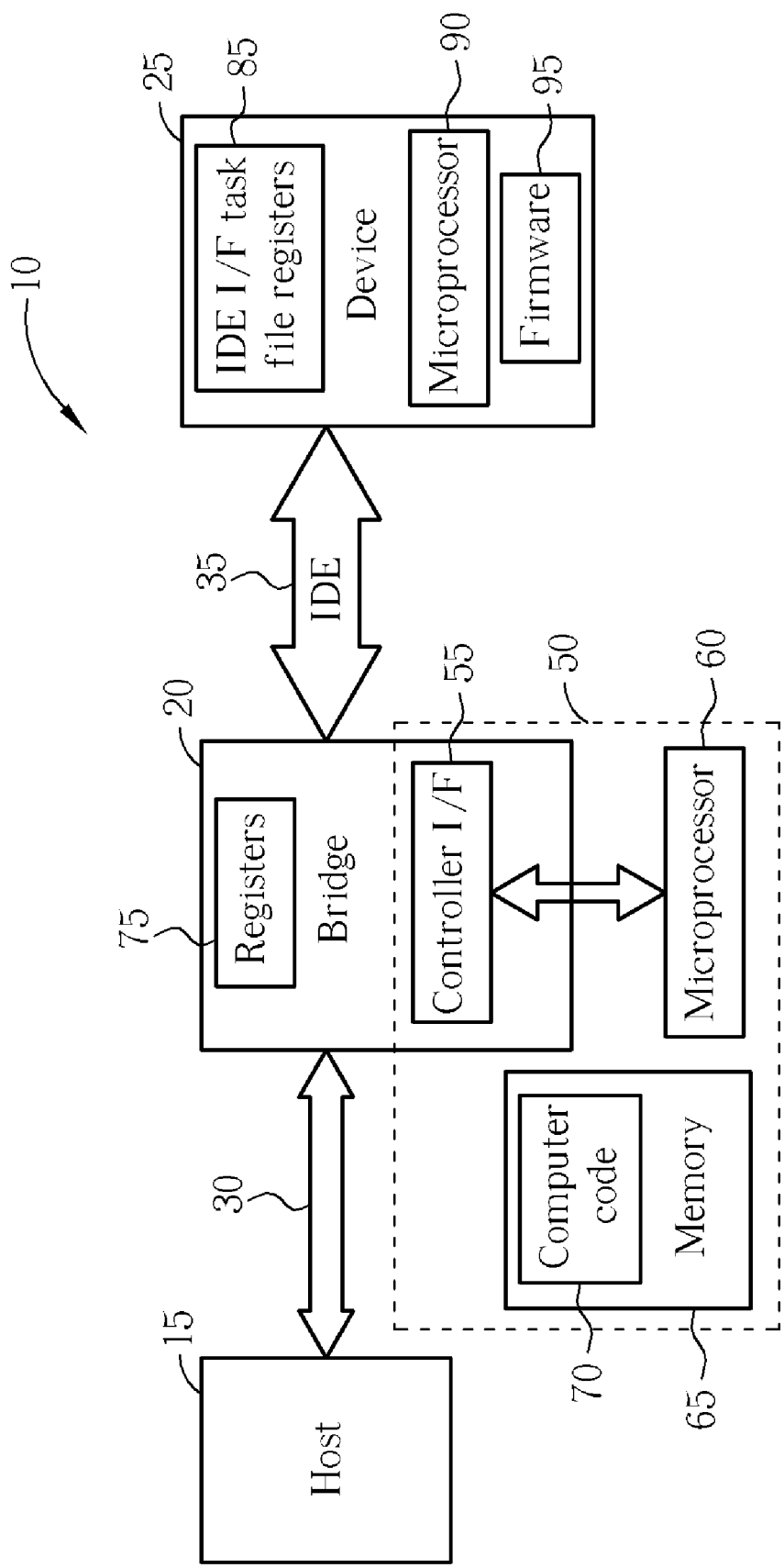
FIG. 1 is a functional block diagram of conventional Host-Bridge-Device system.
Figure 2:
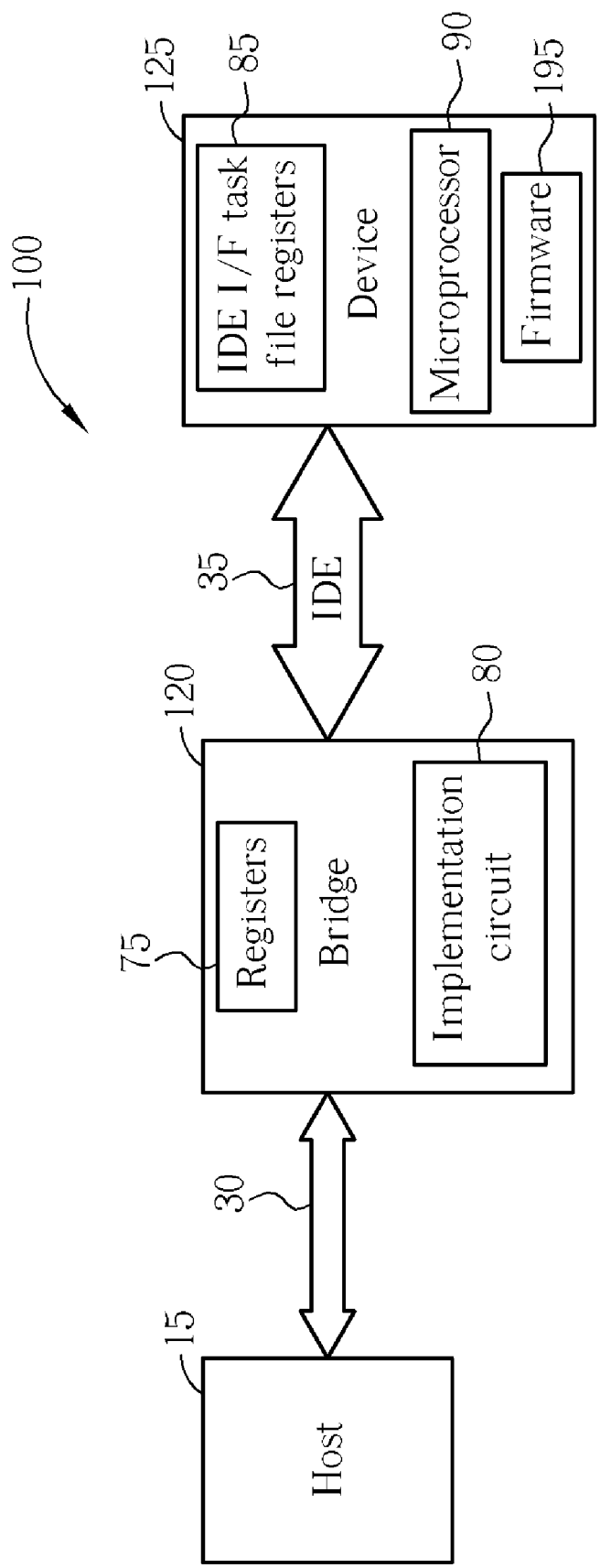
FIG. 2 is a functional block diagram of Host-Bridge-Device system according to the present invention.

FIG. 2 is a functional block diagram of a Host-Bridge-Device system 100 according to the present invention. Where the components and functionality of the components are the same as depicted in FIG. 1, the original reference numbers have been maintained for clarity.

The system 100 comprises a host computer system 15, a bridge 120, and a data storage device 125. A first bus interface 30 connects the host 15 with the bridge 120 and allows communications between the host 15 and the bridge 120 according to a first communications protocol. A second bus interface 35 connects the bridge 120 with the data storage device 125 and allows communications between the bridge 120 and the data storage device 125 according to a version of Integrated Device Electronics (IDE) communications protocol.

The data storage device 125 comprises a microprocessor 90, firmware 195 comprising computer code for operating the data storage device 125 and for controlling the bridge 120, and a plurality of IDE I/F task file registers 85 used for the transfer of data and control instructions to and from the bridge 120. The bridge 120 of the present invention does not comprise the prior art control circuitry 50 depicted in FIG. 1. However, the bridge 120 does comprise a corresponding plurality of registers 75 for realizing the bridge functions. The bridge 120 further comprises an implementation circuit 80 for carrying out requests received from the data storage device 125. The implementation circuit 80 is hardwired in a preferred embodiment of the present invention but another embodiment may employ an implementation circuit that is not hardwired, such as being software instructions coded in firmware or another form of memory.

As is known in the art, control of the bridge 120 is affected by the reading and writing to and from the registers 75. The present invention utilizes the IDE bus 35 and a firmware-only modified IDE data storage device 25 instead of all those elements inside the dash-lined block 50 in FIG. 1. Please refer to FIG. 3 and FIG. 4 which are flowcharts demonstrating how this is done according to the present invention.

Figure 3:
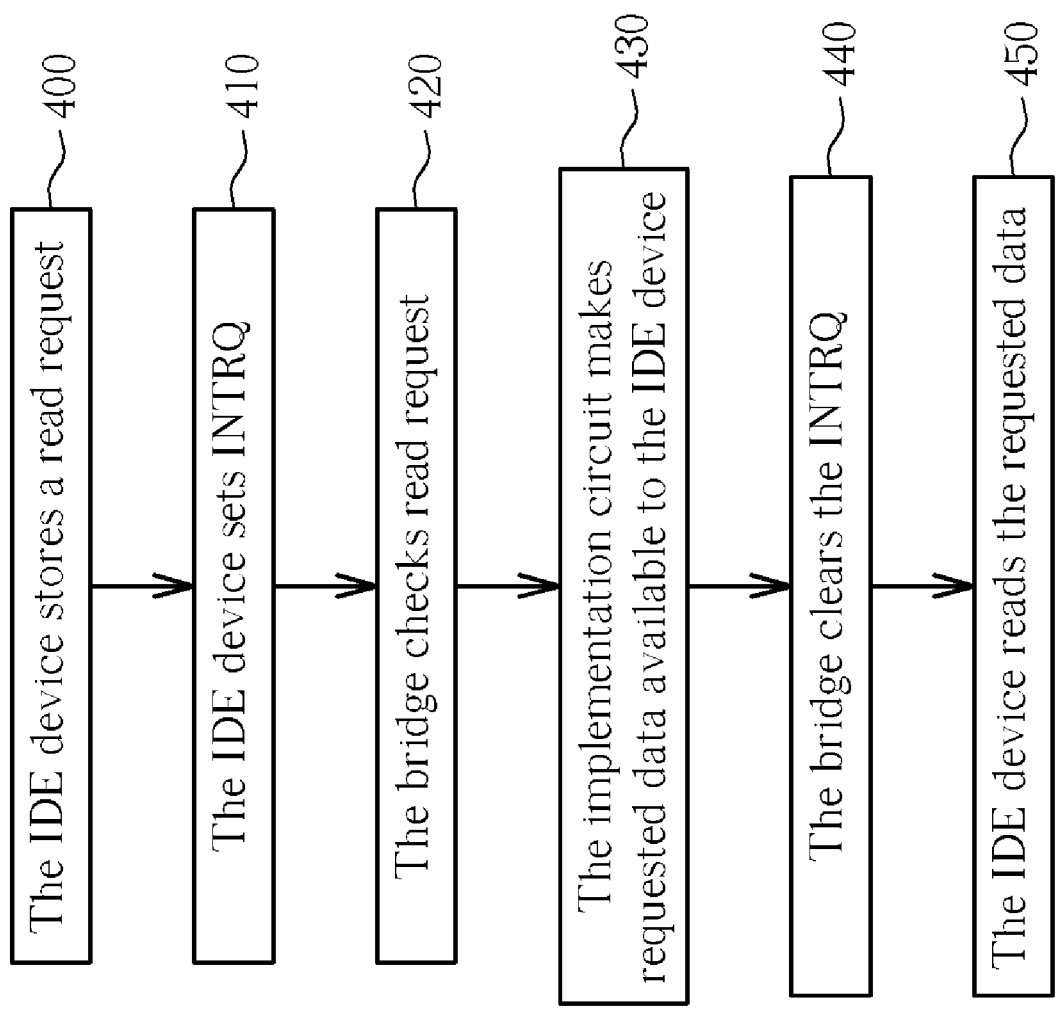
FIG. 3 is a flowchart of the device according to the present invention reading a bridge register.

FIG. 3 illustrates the present invention method of how the IDE data storage device 125 can read one of the registers 75 in the bridge 120. The steps shown in FIG. 3 include the following:

Step 400: The IDE data storage device 125 stores a first instruction into a first predetermined IDE I/F task file register 85 in the IDE device 125, the value of the first instruction indicating a read request and which register 75 in the bridge 120 is to be read.

Step 410: The IDE data storage device 125 sets an Interrupt Request (INTRQ) signal high.

Step 420: The bridge 120 receives the INTRQ from the IDE data storage device 125 and checks the contents of the first predetermined IDE I/F task file register 85.

Step 430: The implementation circuit 80 receives the contents of the first predetermined IDE I/F task file register 85 and causes the contents of the indicated register 75 to be placed into a second predetermined IDE I/F task file register 85 in the IDE data storage device 125.

Step 440: The bridge 120 clears the INTRQ.

Step 450: The IDE data storage device 125 reads the second predetermined IDE I/F task file register 85 in the IDE data storage device 125.

Figure 4:
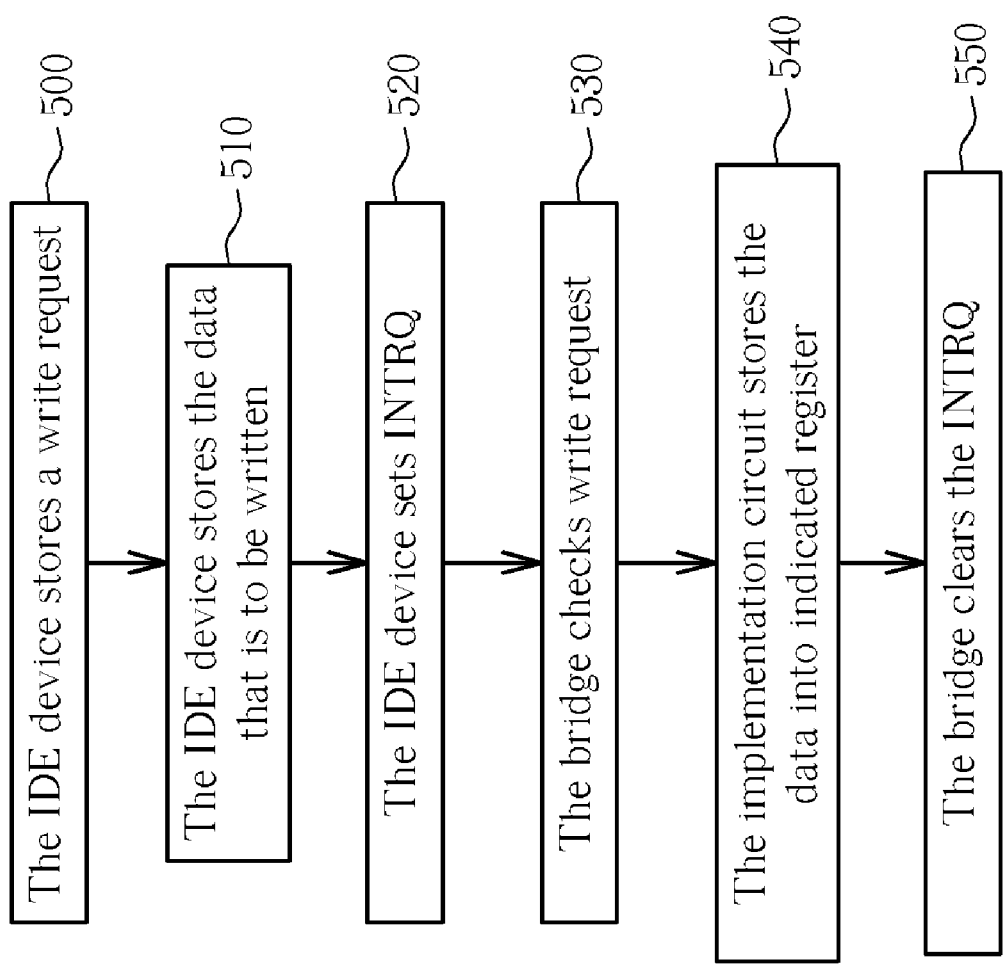
FIG. 4 is a flowchart of the device according to the present invention writing to a bridge register.

FIG. 4 illustrates the present invention method of how the IDE data storage device 125 can write to one of the registers 75 in the bridge 120. The steps shown in FIG. 4 include the following. Obviously, the order of steps 500 and 510 can be reversed.

Step 500: The IDE data storage device 125 stores a second instruction into a third predetermined IDE I/F task file register 85 in the IDE data storage device 125, the value of the second instruction indicating a write request and which register 75 in the bridge 120 to which data is to be written.

Step 510: The IDE data storage device 125 stores the data that is to be written into the indicated register 75 in the bridge into a fourth predetermined IDE I/F task file register 85 of the IDE data storage device 125.

Step 520: The IDE data storage device 125 sets an Interrupt Request (INTRQ) signal high.

Step 530: The bridge 120 receives the INTRQ from the IDE data storage device 125 and checks the contents of the third predetermined IDE I/F task file register 85.

Step 540: The implementation circuit 80 reads the contents of the fourth predetermined IDE I/F task file register 85 and places the read contents into the register 75 of the bridge 120 indicated by the third predetermined IDE I/F task file register 85.

Step 550: The bridge 120 clears the INTRQ.

It should be obvious that no change in the hardware of the IDE data storage device 125 is required to implement the present invention; only a change in the firmware already existing in a conventional IDE data storage device is needed.

It should also be obvious that a second device of the present invention (e.g. a bridge, a host computer, or other apparatus) requires compatible implementation circuitry to correctly respond to the control instructions issued by the IDE data storage device. The compatible implementation circuitry preferably is hardwired but may be possible to implement in some other fashion, such as via computer code located in firmware or some other form of memory in the second device. The use of computer code to respond as if it was the preferred compatible implementation circuitry would require the use of a microprocessor to execute the software, increasing the cost of the second device.

The following description includes some specific exemplary embodiments of the present invention directed at a system 100 including a host computer 15, a gateway 120, and a data storage device 125 such as that shown in FIG. 2. According to the present invention, the data storage device 125 is coupled to the gateway utilizing an IDE bus 35, while the host computer 15 is coupled to the gateway utilizing another bus 30. It should be noted that the bus 30 could be implemented as a universal serial bus or another type of interconnect bus such as Serial ATA etc. Normal usage of the system 100 includes the host computer 15 accessing data in the data storage device 125 via the gateway 120. This is typical operation already well understood in the art so further description of this aspect is omitted herein for brevity. However, according to this embodiment, the data storage device 125 can also utilize the IDE bus 35 and associated IDE interface I/F task file registers 75 of the bridge and registers of the data storage device 125 to control operations of the gateway. Specifically, the data storage device 125 can directly adjust parameters of the link 30 between the host computer 15 and the gateway 120. Specifically, the system 100 a) utilizes reading and writing to predetermined IDE I/F task file register 85 in order to take written content from a first device 125 and pass it to the registers 75 of another apparatus 120 using the IDE bus 35; and b) utilizes reading and writing to predetermined IDE I/F task file registers 75 in order to take content read from the registers 75 of another device 120 and pass it to the first device 125. As will be explained in the following, the written/read information has nothing to do with the IDE bus.

In a first embodiment, the end that is being controlled (for example, the other apparatus such as the gateway 120) according to the written connect changes its behavior accordingly. In a host-bridge-drive system 100, the drive 125 (a first apparatus) utilizes the IDE bus/task file registers 85 to send to the bridge 120 (another apparatus) a predetermined value, for example 0×AA. This value represents that the bridge 120 is to close the interface 30 with the host computer 15. When the bridge 120 receives this predetermined value (the value is stored in a register 75), the bridge 120 immediately executes the above-described operation to disconnect the interface 30 from the host computer 15. That is, the host computer 15 and bridge 120 are thereafter no longer capable of communications.

In a second embodiment, the end that is being controlled (for example, the other apparatus such as the gateway 120) provides read information to allow the controlling end (the drive 125) to understand the status of the device 120 that is being controlled. In the host-bridge-drive system 100, the drive 125 (a first apparatus) utilizes the IDE bus/task file registers 85 to read a status value from the bridge 120 (another apparatus), the status value being stored in a particular register 75. For example, a status value of 0×BB represents that the interface 30 between the bridge 120 and host computer 15 is in a open and connected state. In this way, the data storage device can determine that the host computer 15 and the bridge 120 can communicate.

In another embodiment, assume the interface 30 between the host computer 15 and the gateway 120 is a USB bus 30. The available speed settings of the USB bus 30 include low speed, full speed, and high speed settings. Furthermore, the prior art bridge 20 of FIG. 1 is only capable of fixed speed settings. For example, when connected between a host computer 15 and an optical drive 25, the bridge 20 is always set to operate at high speed. However, there are many different types of devices and drives (for example different optical devices), and some of these devices may not support the high speed setting. That is, permanently setting the speed of the USB interface 30 of the gateway to high speed causes wasted efficiency. For example, clocks will be running at their highest rates even though not required, and there will be many unused cycles of the USB bus 30. Therefore, in this embodiment of the present invention, the drive 125 controls the gateway 120 to set the speed of the USB interface 30 to the actual highest allowable speed of the drive 125. In this way, overall system 100 efficiency is increased. Some specific operational examples are provided below.

In a host-bridge-drive system 100, for example, if the drive 125 is at most capable of transmitting data at a rate corresponding to the full speed transmission speed of the USB interface 30, the drive 125 (the first apparatus) utilizes the IDE bus/task file registers 85 to send to the bridge 120 (another apparatus) a predetermined value 0×C2. This predetermined value represents that future bridge 120 to host computer 15 communications are to be performed using the USB full speed setting. When the bridge 120 receives this predetermined value (being saved in a register 75), the bridge 120 immediately executes the above-described operation to change the transmission speed of the USB interface 30. In this way, the host end 15 will utilize the USB full speed rate to communicate with the bridge 120. Alternatively, if the drive 125 is capable of transmitting data at a rate corresponding to the high speed transmission speed of the USB interface 30, the drive 125 (the first apparatus) utilizes the IDE bus/task file registers 85 to send to the bridge 120 (another apparatus) a predetermined value 0×C3. This predetermined value represents that future bridge 120 to host computer 15 communications are to be performed using the USB high speed setting. When the bridge 120 receives this predetermined value (being saved in a register 75), the bridge 120 immediately executes the above-described operation to change the transmission speed of the USB interface 30. In this way, the host computer 15 will utilize the high speed to communicate with the bridge 120.

Another exemplary embodiment utilizing an optical storage device is as follows. As previously mentioned, the available speed settings of the USB interface 30 include low speed, full speed, and high speed settings. Furthermore, the prior art bridge 20 only is capable of permanently selecting the speed. For example, using a bridge 20 for an optical drive 25, the interface 30 is always set to high speed. However, even if the optical drive 25 can support the high speed setting, if the host computer 15 only supports or is connected to a low speed or full speed port, then the host 15 to bridge 120 communications will also only be able to use low speed or full speed speed settings. If the drive 25 is still utilizing high speed to perform operations then this will result in wasted efficiency and increased power consumption of both the drive 25 and the gateway 20. Therefore, in this embodiment of the present invention, the drive 125 checks the host speed setting in order to control drive 120 speed setting. To ensure minimum speed required is utilized, the drive adjusts the speed setting of the IDE bus to correspond to within a predetermined range of the speed setting of the USB bus. In this way, the overall efficiency is increased and electrical power requirements are reduced. The following describes some specific exemplary operations.

In a host-bridge-drive system 100, for example, if the drive 125 supports data rates corresponding to the high speed setting of the USB bus 30 but the host computer 15 only supports the low speed setting or is connected to a low speed port, the drive (a first apparatus) utilizes the IDE bus/task file registers 85 to read a USB interface 30 speed setting for the bridge 120 (another apparatus). The USB interface 30 speed setting value is stored in a particular register 75 of the bridge 120. In one embodiment, the predetermined value 0×01 represents that the interface 30 between the bridge 120 and the host computer 15 is operating utilizing the low speed setting. In this situation, the drive 125 sets its spindle speed to a lower speed to match the low speed between the host computer 15 and the bridge 120 (i.e., the drive 125 changes its own speed to correspond to the low speed).

If the drive supports the high speed setting but the host computer 15 only supports the full speed setting or is connected to a full speed port, the drive (a first apparatus) utilizes the IDE bus/task file registers 85 to read a USB interface 30 speed setting for the bridge 120 (another apparatus). The USB interface 30 speed setting value is stored in a particular register 75 of the bridge 120. In one embodiment, the predetermined value 0×02 represents that the interface 30 between the bridge 120 and the host computer 15 is operating utilizing the full speed setting. In this situation, the drive 125 sets its spindle speed to a middle speed to match the full speed between the host computer 15 and the bridge 120 (i.e., the drive 125 changes its own speed to correspond to the full speed).

Finally, if the drive 125 supports the high speed setting and the host computer 15 also supports the high speed setting or is connected to a high speed port, the drive (a first apparatus) utilizes the IDE bus/task file registers 85 to read a USB interface 30 speed setting for the bridge 120 (another apparatus). The USB interface 30 speed setting value is stored in a particular register 75 of the bridge 120. In one embodiment, the predetermined value 0×03 represents that the interface 30 between the bridge 120 and the host computer 15 is operating utilizing the high speed setting. In this situation, the drive 125 sets its spindle speed to a higher speed to match the high speed between the host computer 15 and the bridge 120 (i.e., the drive 125 changes its own speed to correspond to the high speed).

It should be noted that the present invention is not be limited to the use of a bridge. For example, there is no reason that the IDE device of the present invention could not be directly connected to a host computer (or other apparatus) that comprises either a software form or a hardwired form of the implementation circuitry. All that is required for the IDE data storage device of the present invention to control a second device through an IDE bus connecting the IDE data storage device with the second device is that the second device be compatible. A compatible device is defined as comprising the compatible implementation circuitry so that the compatible device responds to instructions issued by the IDE data storage device as described above.

It is an advantage of the claimed invention that the IDE data storage device can control a second device through an IDE bus, reducing hardware requirements, cost, and complexity of the second device.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A system comprising:
a first device;
an Integrated Drive Electronics (IDE) bus; and
a data storage device having a first task file register, the data storage device being coupled to the first device via the IDE bus for storing data within the data storage device as received from the first device via the IDE bus, or for passing the data stored within the data storage device to the first device via the IDE bus according to commands passed from the first device via the IDE bus;
wherein the data storage device is further for controlling predetermined operations of the first device by storing different values within the first task file register, and the first device is for reading the first task file register of the data storage device via the IDE bus and performing the predetermined operations according to the different values.

2. The system of claim 1, further comprising:
a host computer being coupled to the first device utilizing a second bus being of a type different than the IDE bus;
wherein the host computer is for generating the commands and the data for storage into the data storage device; and the first device is a gateway for passing the commands and the data from the host computer to the data storage device, and also for transferring the data from the data storage device to the host computer according to the commands generated by the host computer.

3. The system of claim 2, wherein the data storage device is for shutting off the second bus between the host computer and the gateway by storing a predetermined value in the first task file register; and the gateway is further for terminating communications with the host computer on the second bus after reading the predetermined value from the first task file register.

4. The system of claim 2, wherein the data storage device is for turning on the second bus between the host computer and the gateway by storing a predetermined value in the first task file register; and the gateway is further for enabling communications with the host computer on the second bus after reading the predetermined value from the first task file register.

5. The system of claim 2, wherein the gateway includes a second task file register; and the data storage device is further for reading a status of the gateway from the second task file register utilizing the IDE bus, and controlling the predetermined operations of the gateway by storing the different values within the first task file register according to the status of the gateway.

6. The system of claim 2, wherein the second bus is a universal serial bus (USB).

7. The system of claim 2, wherein the data storage device is an optical storage device.

8. The system of claim 2, wherein the gateway further includes an implementation circuit for decoding and acting upon the different values stored in the first task file register by the data storage device when the gateway receives an Interrupt Request (INTRQ) issued by the data storage device; and the data storage device is further for sending the INTRQ to the gateway after storing each different value in the first task file register.

9. The system of claim 5, wherein the gateway is for storing a speed setting of the second bus between the gateway and the host computer in the second task file register as the status of the gateway.

10. The system of claim 9, wherein the data storage device is further for adjusting a speed setting of the data storage device according to the speed setting of the second bus between the gateway and the host computer as read from the second task file register.

11. The system of claim 10, wherein the data storage device is further for adjusting the speed setting of the data storage device to correspond to within a predetermined range of the speed setting of the second bus as specified in the second task file register.

12. A method of utilizing an Integrated Drive Electronics (IDE) bus for controlling a first device by a data storage device, the method comprising:
providing a first task file register in the data storage device;
coupling the first device to the data storage device via the IDE bus;
storing data within the data storage device as received from the first device via the IDE bus and passing the data stored within the data storage device to the first device via the IDE bus according to commands passed from the first device via the IDE bus;
storing different values within the first task file register by the data storage device;
reading the first task file register of the data storage device via the IDE bus by the first device; and
performing the predetermined operations by the first device according to the different values read from the first task file register.

13. The method of claim 12, further comprising:
providing a host computer being coupled to the first device utilizing a second bus being of a type different than the IDE bus; and
generating the commands and the data for storage into the data storage device utilizing the host computer;
wherein the first device is a gateway for passing the commands and the data from the host computer to the data storage device, and also for transferring the data from the data storage device to the host computer according to the commands generated by the host computer.

14. The method of claim 13, further comprising:
shutting off the second bus between the host computer and the gateway by storing a predetermined value in the first task file register; and terminating communications with the host computer on the second bus by the gateway after reading the predetermined value from the first task file register.

15. The method of claim 13, further comprising:
turning on the second bus between the host computer and the gateway by storing a predetermined value in the first task file register; and
enabling communications with the host computer on the second bus by the gateway after reading the predetermined value from the first task file register.

16. The method of claim 13, further comprising:
providing a second task file register in the gateway;
reading a status of the gateway from the second task file register utilizing the IDE bus by the data storage device; and
controlling the predetermined operations of the gateway by storing the different values within the first task file register according to the status of the gateway.

17. The method of claim 13, wherein the second bus is a universal serial bus (USB).

18. The method of claim 13, wherein the data storage device is an optical storage device.

19. The method of claim 13, further comprising:
providing an implementation circuit within the gateway for decoding and acting upon the different values stored in the first task file register by the data storage device when the gateway receives an Interrupt Request (INTRQ) issued by the data storage device; and
sending the INTRQ to the gateway after storing each different value in the first task file register.

20. The method of claim 16, further comprising storing a speed setting of the second bus between the gateway and the host computer in the second task file register as the status of the gateway.

21. The method of claim 20, further comprising adjusting a speed setting of the data storage device according to the speed setting of the second bus between the gateway and the host computer as read from the second task file register.

22. The method of claim 21, further comprising adjusting the speed setting of the data storage device to correspond to within a predetermined range of the speed setting of the second bus as specified in the second task file register.

* * * * *

UNITED STATES PATENT AND TRADEMARK OFFICE
CERTIFICATE OF CORRECTION

PATENT NO. : 7,346,727 B2  Page 1 of 1
APPLICATION NO. : 11/379804
DATED : March 18, 2008
INVENTOR(S) : Yuan-Ting Wu et al.

It is certified that error appears in the above-identified patent and that said Letters Patent is hereby corrected as shown below:

On the title page, item (73), correct the residence of the assignee from "Hsin-Chu, Hsien" to -- "Hsin-Chu Hsien" --

On the title page, item (54), correct the invention title from "METHOD AND SYSTEM FOR CONTROL OF A FIRST DEVICE BY DATA STORAGE DEVICE THROUGH STORING DIFFERENT VALUES WITHIN TASK FILE REGISTER BY THE DATA STORAGE DEVICE AND READING TASK FILE REGISTER AND PERFORMING CORRESPONDING PREDETERMINED OPERATIONS BY THE FIRST DEVICE VIA AN IDE BUS" to -- "METHOD AND SYSTEM FOR CONTROL OF A FIRST DEVICE BY A DATA STORAGE DEVICE THROUGH STORING DIFFERENT VALUES WITHIN TASK FILE REGISTER BY THE DATA STORAGE DEVICE AND READING TASK FILE REGISTER AND PERFORMING CORRESPONDING PREDETERMINED OPERATIONS BY THE FIRST DEVICE VIA AN IDE BUS" --

Signed and Sealed this

Eighth Day of July, 2008

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,346,727 B2 | Page 1 of 1 |
| APPLICATION NO. | : 11/379804 | |
| DATED | : March 18, 2008 | |
| INVENTOR(S) | : Yuan-Ting Wu et al. | |

It is certified that error appears in the above-identified patent and that said Letters Patent is hereby corrected as shown below:

On the title page, item (73), correct the residence of the assignee from "Hsin-Chu, Hsien" to -- "Hsin-Chu Hsien" --

On the title page, item (54), and Column 1, lines 1-9 correct the invention title from "METHOD AND SYSTEM FOR CONTROL OF A FIRST DEVICE BY DATA STORAGE DEVICE THROUGH STORING DIFFERENT VALUES WITHIN TASK FILE REGISTER BY THE DATA STORAGE DEVICE AND READING TASK FILE REGISTER AND PERFORMING CORRESPONDING PREDETERMINED OPERATIONS BY THE FIRST DEVICE VIA AN IDE BUS" to -- "METHOD AND SYSTEM FOR CONTROL OF A FIRST DEVICE BY A DATA STORAGE DEVICE THROUGH STORING DIFFERENT VALUES WITHIN TASK FILE REGISTER BY THE DATA STORAGE DEVICE AND READING TASK FILE REGISTER AND PERFORMING CORRESPONDING PREDETERMINED OPERATIONS BY THE FIRST DEVICE VIA AN IDE BUS" --

This certificate supersedes the Certificate of Correction issued July 8, 2008.

Signed and Sealed this

Twenty-ninth Day of July, 2008

JON W. DUDAS
*Director of the United States Patent and Trademark Office*